United States Patent
Moon

(10) Patent No.: US 8,558,510 B2
(45) Date of Patent: Oct. 15, 2013

(54) APPARATUS FOR STORING POWER AND METHOD OF CONTROLLING THE SAME

(75) Inventor: Chong-Sop Moon, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 303 days.

(21) Appl. No.: 12/913,159

(22) Filed: Oct. 27, 2010

(65) Prior Publication Data

US 2011/0140667 A1 Jun. 16, 2011

(30) Foreign Application Priority Data

Dec. 11, 2009 (KR) ........................ 10-2009-0123389

(51) Int. Cl.
*H02J 7/00* (2006.01)
*H02J 7/04* (2006.01)
*H02J 1/12* (2006.01)
*H02J 1/00* (2006.01)
*H02M 7/537* (2006.01)

(52) U.S. Cl.
USPC ............... 320/134; 320/140; 307/25; 307/46; 307/80; 307/82; 363/17; 363/34; 363/37; 363/131

(58) Field of Classification Search
USPC .................................................. 320/134, 140
See application file for complete search history.

(56) References Cited

U.S. PATENT DOCUMENTS

| | | | |
|---|---|---|---|
| 6,914,418 B2 * | 7/2005 | Sung | 320/140 |
| 8,072,187 B2 * | 12/2011 | Wu et al. | 320/140 |
| 8,143,856 B2 * | 3/2012 | Andrea et al. | 320/128 |
| 8,183,820 B2 * | 5/2012 | Anwar et al. | 320/104 |
| 2004/0062059 A1 * | 4/2004 | Cheng et al. | 363/17 |
| 2006/0152224 A1 | 7/2006 | Kim et al. | |
| 2011/0115295 A1 * | 5/2011 | Moon et al. | 307/65 |

FOREIGN PATENT DOCUMENTS

| | | |
|---|---|---|
| JP | 2001-298872 | 10/2001 |
| JP | 2002-171674 | 6/2002 |
| JP | 2003348768 | 12/2003 |
| JP | 2006524332 | 10/2006 |
| JP | 2009-153339 | 7/2009 |

OTHER PUBLICATIONS

Korean Office Action issued by KIPO, dated Mar. 18, 2011, corresponding to Korean Patent Application No. 10-2009-0123389, together with request for Entry.

* cited by examiner

*Primary Examiner* — M'Baye Diao
(74) *Attorney, Agent, or Firm* — Robert E. Bushnell, Esq.

(57) ABSTRACT

Provided are a power storage apparatus and a method of controlling the power storage apparatus. The power storage apparatus stores power supplied from a power generation system or a power grid. The power storage apparatus supplies stored power to a load during an electric failure, and supplies stored power to the power grid. The power storage apparatus includes at least one battery cell, a battery management unit coupled to the battery cell, a bi-directional converter coupled to the battery management unit, a bi-directional inverter coupled between the bi-directional converter and the power grid, and a central controller controlling the operations of the bi-directional converter, the bi-directional inverter, and the battery management unit. An uninterruptible power supply (UPS) function may be performed to stabilize the power storage system including the power storage apparatus.

8 Claims, 6 Drawing Sheets

APPARATUS FOR STORING POWER AND METHOD OF CONTROLLING THE SAME

CLAIM OF PRIORITY

This application makes reference to incorporates the same herein, and claims all benefits accruing under 35 U.S.C. §119 from an application earlier filed in the Korean Intellectual Property Office on 11 Dec. 2009 and, there duly assigned Serial No. 10-2009-0123389.

BACKGROUND OF THE INVENTION

1. Field of the Invention

One or more embodiments of the present invention relate to a power storage apparatus for storing power supplied from a power generation system or from a power grid, supplying stored power to loads when an electric failure occurs, and supplying stored power to the power grid, and a method of controlling the power storage apparatus.

2. Description of the Related Art

Recently, as problems such as environmental pollution and exhaustion of resources have increased, interest in systems for storing power and efficiently utilizing stored power has increased. In addition, renewable energy such as photovoltaic power generation has become very important. In particular, the renewable energy uses natural resources such as solar light, wind power, or tidal power, and does not generate pollution during power generation. Thus, research into applications of the renewable energy is actively being conducted. Recently, information technology has been combined with conventional power grid systems to develop smart grid systems, in which a power provider and consumers exchange information in a dual-way manner to optimize energy efficiency.

SUMMARY OF THE INVENTION

One or more embodiments of the present invention include a power storage system for stably performing an uninterruptible power supply (UPS) function.

Additional aspects will be set forth in part in the description which follows and, in part, will be apparent from the description, or may be learned by practice of the presented embodiments.

According to one or more embodiments of the present invention, a power storage apparatus includes a bi-directional inverter, at least one battery cell, a battery management unit, a bi-directional converter, and a central controller. The bi-directional inverter is connected between a first node and a second node that is connected to a power grid and a load. The bi-directional inverter converts a direct current (DC) voltage supplied from the first node to an alternating current (AC) voltage and outputs the AC voltage to the second node. The bi-directional inverter converts an AC voltage supplied from the power grid to a DC voltage and outputs the DC voltage to the first node. The battery management unit detects a remaining amount of power in the at least one battery cell and controls charging/discharging of the at least one battery cell. The bi-directional converter is connected between the battery management unit and the first node. The bi-directional converter converts a DC voltage supplied from the at least one battery cell to another DC voltage and outputs the another DC voltage to the bi-directional inverter via the first node. The bi-directional converter converts a DC voltage supplied from the bi-directional inverter to another DC voltage and outputs the another DC voltage to the at least one battery cell. The central controller performs a control operation for charging the at least one battery cell with power supplied from the power grid. The central controller controls the battery management unit, the bi-directional converter, and the bi-directional inverter so as to supply power stored in the at least one battery cell to the power grid. The central controller blocks the power supply from the at least one battery cell to the power grid when the remaining amount of power of the at least one battery cell is lower than a reference level.

The central controller may control the battery management unit, the bi-directional converter, and the bi-directional inverter so as to supply the power from the at least one battery cell to the load when the power grid is in an abnormal state.

The central controller may control the battery management unit, the bi-directional converter, and the bi-directional inverter so as to supply the power stored in the at least one battery cell to the load when power consumption of the load is equal to or greater than a reference power consumption level. The central controller may control the battery management unit, the bi-directional converter, and the bi-directional inverter so as not to supply the power stored in the at least one battery cell to the load even if the power consumption of the load is equal to or greater than the reference power consumption level, when the remaining power of the at least one battery cell is lower than the reference level.

The power storage apparatus may further include a power conversion unit for converting power supplied from a power generation system into a DC voltage, and outputting the DC voltage to the bi-directional converter via the first node. The bi-directional converter converts the DC voltage from the power conversion unit to another DC voltage and outputting the another DC voltage to the at least one battery cell. The power generation system may include a solar battery, and the power conversion unit may control a level of generated power so as to track a maximum power supply voltage from the solar battery by using a maximum power point tracker (MPPT) algorithm.

The power storage apparatus may further include a voltage stabilization unit connected to the first node for stabilizing a voltage level at the first node.

The power storage apparatus may further include a first switch connected between the bi-directional inverter and the second node, and a second switch connected between the second node and the power grid. The central controller turns the first switch and the second switch on when the power grid is in the normal state, and turns the first switch on and turns the second switch off when the power grid is in the abnormal state.

According to one or more embodiments of the present invention, a method of controlling power storage apparatus for storing power supplied from a power grid to at least one battery cell and for controlling a power storage system including a load consuming the power. The method includes detecting a remaining amount of power stored in at least one battery cell; supplying the power stored in the at least one battery cell to the power grid when the remaining amount of power is higher than a reference level; and blocking the power supply from the at least one battery cell to the power grid when the remaining amount of power is lower than the reference level.

The method may further include monitoring a state of the power grid; and supplying the power stored in the at least one battery cell to the load when the power grid is in an abnormal state. The method may further include blocking the power supply from the at least one battery cell to the power grid when the power grid is in the abnormal state.

The method may further include monitoring power consumption of the load; and supplying the power stored in the at least one battery cell to the load when the power consumption of the load is equal to or greater than a reference power consumption level. The method may further include controlling so as not to supply the power stored in the at least one battery cell to the load even if the power consumption of the load is equal to or greater than the reference level, when the remaining amount of power of the at least one battery cell is lower than the reference level.

The method may further include converting a DC voltage supplied from a power generation system to another DC voltage required by the at least one battery cell; and charging the at least one battery cell with the power from the power generation system. The power generation system may include a solar battery, and the method may further include controlling a level of generated power so as to track a maximum power supply voltage from the solar battery by using a maximum power point tracker (MPPT) algorithm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
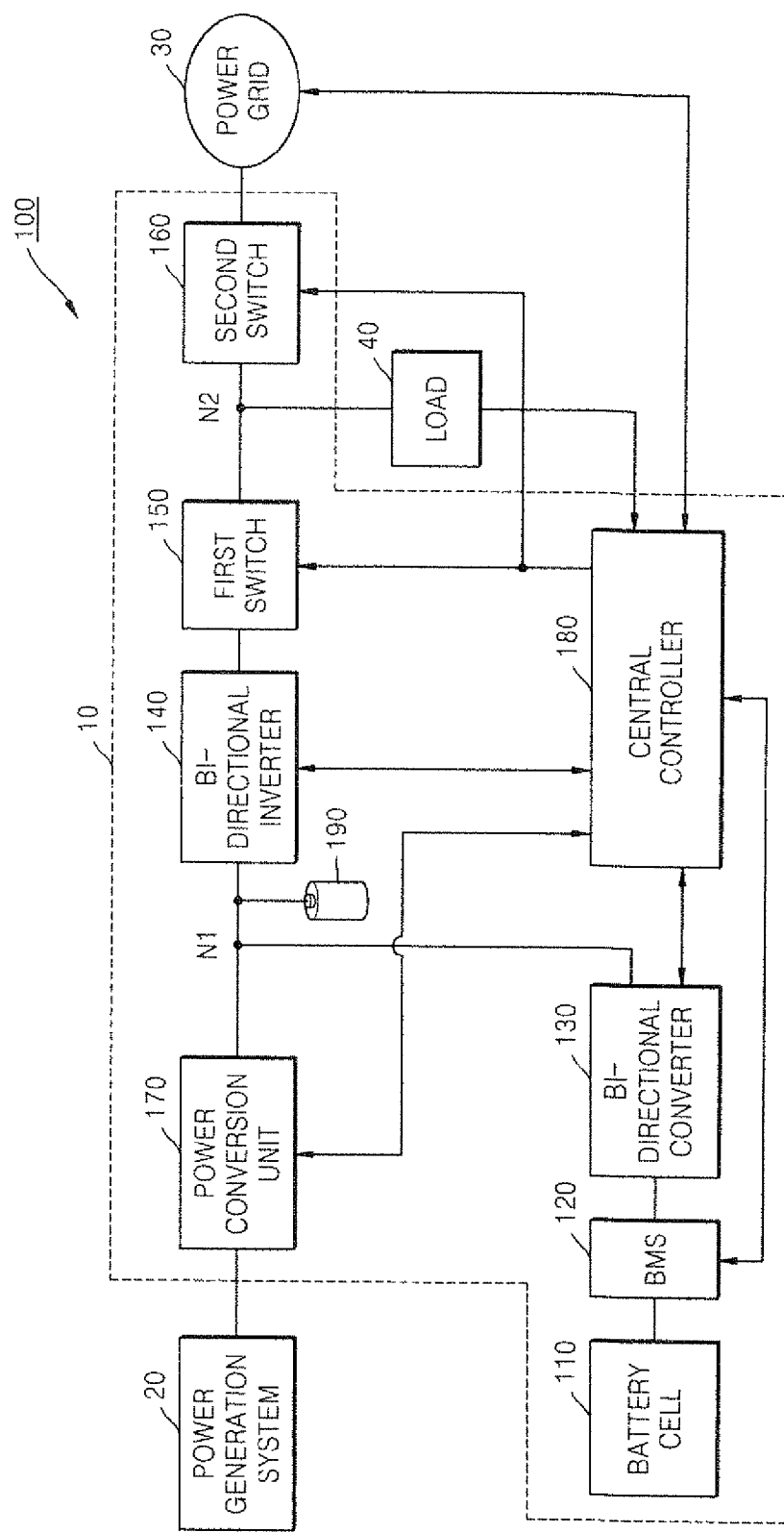
FIG. 1 is a block diagram of a power storage system according to an embodiment of the present invention.

Recently, as problems such as environmental pollution and exhaustion of resources have increased, interest in systems for storing power and efficiently utilizing stored power has increased. In addition, renewable energy such as photovoltaic power generation has become very important. In particular, the renewable energy uses natural resources such as solar light, wind power, or tidal power, and does not generate pollution during power generation. Thus, research into applications of the renewable energy is actively being conducted. Recently, information technology has been combined with conventional power grid systems to develop smart grid systems, in which a power provider and consumers exchange information in a dual-way manner to optimize energy efficiency.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a block diagram of a power storage system 100 according to an embodiment of the present invention.

The power storage system 100 of the present embodiment includes a power generation system 20 generating electric power, a power grid 30 transferring the electric energy, a power storage apparatus 10 storing the power and outputting the stored power to a load 40 or the power grid 30, and a load 40 receiving the electric power from the power storage apparatus 10 or the power grid 30 to consume the energy.

The power grid 30 includes a power plant, a substation, and power transmission cables, and transfers the power to the loads 40 connected to the power grid 30. The power grid 30 supplies the power to the power storage apparatus 10 or the loads 40 in a normal state or condition, and receives the power supplied from the power storage apparatus 10. When the power grid 30 is in an abnormal state or condition caused by, for example, an electric failure or electric work, the power supply from the power grid 30 to the power storage apparatus 10 or the load 40 is stopped, and the power supply from the power storage apparatus 10 to the power grid 30 is also stopped.

The power generation system 20 generates electric energy and outputs the generated energy to the power storage apparatus 10. The power generation system 20 may generate the electric energy from a renewable energy source such as photovoltaic energy, solar heat energy, wind power, tidal power, or geothermal energy. In particular, a solar battery generating power by using the photovoltaic energy may be easily installed in a house or a power plant, and thus, may be suitable for the power storage apparatus 10 which may be distributed in each house or power plant.

The load 40 consumes the power output from the power storage apparatus 10 or the power grid 30, and may be, for example, a house or a power plant.

The power storage apparatus 10 stores the power supplied from the power generation system 20 or the power grid 30, and supplies the stored power to the power grid 30 or the load 40. The power storage apparatus 10 includes at least one battery cell 110, a battery management unit 120, a bi-directional converter 130, a bi-directional inverter 140, a first switch 150, a second switch 160, a power conversion unit 170, a central controller 180, and a voltage stabilization unit 190.

The at least one battery cell 110 stores the power supplied from the power generation system 20 or the power grid 30. Operations of the battery cell 110 are controlled by the battery management unit 120. The at least one battery cell 110 may use various kinds of battery cells, for example, a nickel-cadmium battery, a lead acid battery, a nickel metal hydride (NiMH) battery, a lithium ion battery, a lithium polymer battery, a metal lithium battery, or a zinc air battery. The number of battery cells 110 may be determined according to a power capacity required by the power storage apparatus 10 or design conditions thereof.

The battery management unit 120 is connected to the at least one battery cell 110 to control charging/discharging operations of the battery cell 110. Input/output of a discharging current from the battery cell 110 to the bi-directional converter 130 and a charging current from the bi-directional converter 130 to the battery cell 110 are controlled by the battery management unit 120. In addition, the battery management unit 120 may perform overcharge protection, over-current protection, over-voltage protection, over-heat protection, and cell balancing functions. To this end, the battery management unit 120 may monitor a voltage, current, temperature, remaining power capacity, and lifespan of the battery cell 110.

According to the embodiments of the present invention, the battery management unit 120 detects the remaining amount of power in the battery cell 110 and provides the central controller 180 with information about the remaining amount of power in order to control operations of the power storage apparatus 10. The remaining amount of power may be detected by measuring an output voltage level of the battery cell 110.

The bi-directional converter 130 performs a direct current (DC)-direct current (DC) conversion on the power output from the battery cell 110 to a voltage level required by the bi-directional inverter 140, that is, a DC voltage level at a first node N1, and performs a DC-DC conversion on the charging voltage induced through the first node N1 to the voltage level required by the battery cell 110. The charging voltage is the voltage that is supplied from the power generation system 20 and converted in the power conversion unit 170, or the voltage supplied from the power grid 30 via the bi-directional inverter 140. For example, when the voltage level at the first node N1 is about DC 380V and the voltage level required by the battery cell 110 is about DC 100V, the bi-directional converter 130 converts the charging voltage of the first node N1, which is DC 380V, to the required voltage of the battery cell 110, which is DC 100V during charging of the battery cell 110, and converts the voltage of the battery cell 100, which is DC 100V, to the required voltage of the hi-directional inverter 140, which is DC 380V, during discharging of the battery cell 110. The operation of bi-directional converter 130 is stopped when the voltage conversion is not needed to be performed.

The bi-directional inverter 140 rectifies an alternating current (AC) voltage input from the power grid 30 via the first switch 150 and the second switch 160 into a DC voltage to be stored in the battery cell 110 and outputs the rectified voltage, and converts the DC voltage output from the power generation system 20 or the battery cell 110 into the AC voltage of the power grid 30 and outputs the converted voltage. At this time, the AC voltage output to the power grid 30 is to correspond to a reference of the power grid 30. To this end, the bi-directional inverter 140 synchronizes a phase of the AC voltage output to the power grid 30 with a phase of the power grid 30 to restrain generation of reactive power and adjust the AC voltage level. In addition, the bi-directional inverter 140 may include a filter for filtering radio frequency from the AC power output to the power grid 30, and may perform functions such as restriction of voltage variation range, power factor correction, removal of DC components, and protection of transient phenomenon. The operation of bi-directional inverter 140 is stopped when the voltage conversion or rectification is not needed to be performed.

The first switch 150 and the second switch 160 are connected in series, and are connected between the bi-directional inverter 140 and the power grid 30 to control current flow between the power storage apparatus 10 and the power grid 30. When the power grid 30 is in the normal state, the first switch 150 is turned on and the second switch 160 is turned on so that the power generated by the power generation system 20 may be supplied to the load 40 or the power grid 30 or the power may be supplied from the power generation system 20 to the power storage apparatus 10. If necessary, the first switch 150 is turned off and the second switch 160 is turned on so that the power generated by the power generation system 20 may be supplied to the battery cell 10 and the power may be supplied from the power grid 30 to the load 40. When the power grid 30 is in the abnormal state, the first switch 150 is turned on and the second switch 160 is turned off so as to block the power supply from the power storage apparatus 10 to the power grid 30 and to supply the power from the power storage apparatus 10 and/or the power generation system 20 to the load 40. The first switch 150 and the second switch 160 may be realized by various kinds of switching devices, for example, field effect transistors (FEN or bipolar junction transistors (BJTs). Switching operations of the first switch 150 and the second switch 160 may be controlled by the central controller 180.

The power conversion unit 170 converts the power generated by the power generation system 20 to the DC voltage at the first node N1. Operations of the power conversion unit 170 may vary depending on the kind of the power generation system 20. When the power generation system 20 is a wind power generation system or a tidal power generation system outputting AC voltages, the power conversion unit 170 rectifies the AC voltage of the power generation system 20 to the DC voltage at the first node N1. When the power generation system 20 is the solar battery outputting the DC voltage, the power conversion unit 170 converts the DC voltage of the power generation system 20 to the DC voltage at the first node N1. For example, when the power generation system 20 is the solar battery, the power conversion unit 170 may include a maximum power point tracker (MPPT) converter that converts the DC voltage output from the solar battery to the DC voltage at the first node N1 and uses an MPPT algorithm for tracking the maximum power output voltage according to variations in solar radiation and temperature.

Figure 9:
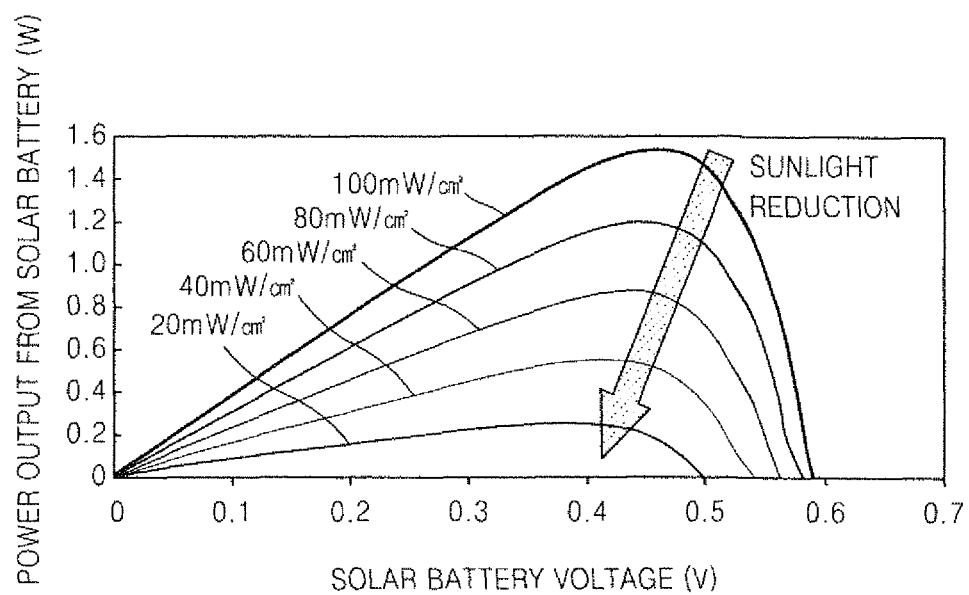
FIG. 9 is an exemplary graph showing a relationship between power output from a solar battery and a solar battery voltage depending on a solar radiant power (power per unit area) according to an embodiment of the present invention.

FIG. 9 is an exemplary graph showing a relationship between power output from a solar battery and a solar battery voltage depending on a solar radiant power (power per unit area). The output of the solar battery has a non-linear characteristic, such as a non-linear I-V characteristic, which represents states of the operating voltage and current of the solar battery according to the environment such as the solar radiant power and the surface temperature. As shown in FIG. 9, the relationship between the power output of the solar battery and the solar battery voltage has a non-linear curve. This relationship also changes depending on the power of sunlight. For example, as shown in FIG. 9, the power output of the solar battery is relatively high at the higher power of sunlight (100 $mW/cm^2$), and is relatively low at the lower power of sunlight (20 $mW/cm^2$). At a given power of sunlight, if an operating voltage of the solar battery is determined, the output power of the solar battery is determined, for example, as shown in the graph of FIG. 9. The MPPT algorithm tracks the maximum power output voltage, which is the voltage at which the power output of the solar battery is maximized, so as to utilize the power generated by the solar battery to the maximum condition. In addition, the MPPT algorithm may use a ride-through technique which compensates for instantaneous voltage drop in order to improve quality of the power generated by the power generation system 20.

The central controller 180 monitors states of the components in the power storage apparatus 10, the power generation system 20, and the power grid 30, and controls operations of the battery management unit 120, the bi-directional converter 130, the bi-directional inverter 140, the first switch 150, the second switch 160, and the power conversion unit 170. The central controller 180 is connected to the load 40 and detects the power consumption of the load 40 by detecting the current flow into the load 40 and the voltage applied to the load 40. Operations of the central controller 180 will be described in detail later.

The voltage stabilization unit 190 stabilizes the DC voltage level at the first node N1 as a DC link level that is the DC voltage level at the first node N1. The voltage level at the first node N1 may be unstable due to the instantaneous voltage dropping of the power generation system 20 or the power grid 30 and peak load generation in the load 40. However, the voltage at the first node N1 needs to be stabilized in order to normally operate the bi-directional converter 130 and the bi-directional inverter 140. Therefore, in order to stabilize the DC voltage level at the first node N1, the voltage stabilization unit 190, for example, a battery, may be further installed. FIG. 1 shows an embodiment, in which an additional voltage stabilization unit 190 is separately formed. However, the voltage stabilization unit 190 may be built in the bi-directional converter 130 the bi-directional inverter 140, or the power conversion unit 170.

Figure 2:
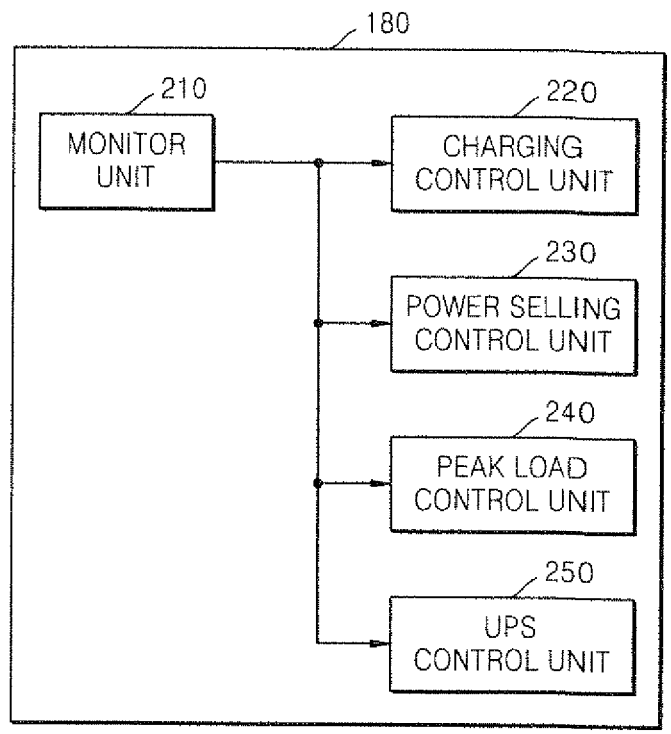
FIG. 2 is a block diagram of an central controller according to an embodiment of the present invention.

FIG. 2 is a block diagram of the central controller 180 according to an embodiment of the present invention.

The central controller 180 includes a monitor unit 210 for monitoring states of the components in the power storage apparatus 10, the power generation system 20, and the power grid 30, a charging control unit 220 controlling the power storage, a power selling control unit 230 for controlling the power supply from the power storage apparatus 10 to the power grid 30, a peak load control unit 240 for dealing with the peak load generation in the load 40, and an uninterruptible power supply (UPS) control unit 250 for performing the UPS control.

The monitor unit 210 monitors the states of the components in the power storage apparatus 10, the power generation system 20, and/or the power grid 30. In more detail, the monitor unit 210 monitors the retraining amount of power, the voltage, the current, and the temperature of the battery cell 110 via the battery management unit 120, and monitors the voltage, current, and the temperature of the bi-directional converter 130. In addition, the monitor unit 210 monitors the voltage, current, temperature, and AC phase of the bi-directional inverter 140, and the power, current, and temperature of the power conversion unit 170. The monitor unit 210 may monitor the AC phase of the power conversion unit 170 when the power generation system 20 outputs the AC voltage. In addition, the monitor unit 210 may monitor the voltage, current, temperature, and AC phase of the power grid 30, and whether the power grid 30 is in the normal state or abnormal state. The monitor unit 210 outputs the monitoring results to the charging control unit 220, the power selling control unit 230, the peak load control unit 240, and the UPS control unit 250. The units 220, 230, 240, and 250 receiving the monitoring results perform the control operations thereof, respectively.

The charging control unit 220 controls the battery management unit 120, the bi-directional converter 130 the bi-directional inverter 140, the first switch 150, the second switch 160, and the power conversion unit 170 in order to store the power supplied from the power generation system 20 or the power grid 30 in the battery cell 110.

When the power supplied from the power grid 30 is to be charged in the battery cell 110, the charging control unit 220 turns the first switch 150 and the second switch 160 on, and controls the bi-directional inverter 140 to rectify the AC voltage supplied from the power grid 30 into a DC voltage, which is supplied to the first node N1. The control of the charging control unit 220, in this case, makes power flow from the power grid 30 to the first node N1. In addition, the charging control unit 220 controls the bi-directional converter 130 to convert the DC voltage supplied from the first node N1 to a DC voltage required by the battery cell 110 so that the battery management unit 120 enables the charging process of the battery cell 110.

When the power supplied from the power generation system 20 is to be charged in the battery cell 110, the charging control unit 220 controls the power conversion unit 170 to convert power supplied from the power generation system 20 to a DC voltage, which is supplied to the first node N1, controls the bi-directional converter 130 to convert the DC voltage at the first node N1 to a DC voltage required by the battery cell 110 so that the battery management unit 120 enables the charging process of the battery cell 110.

Figure 4:
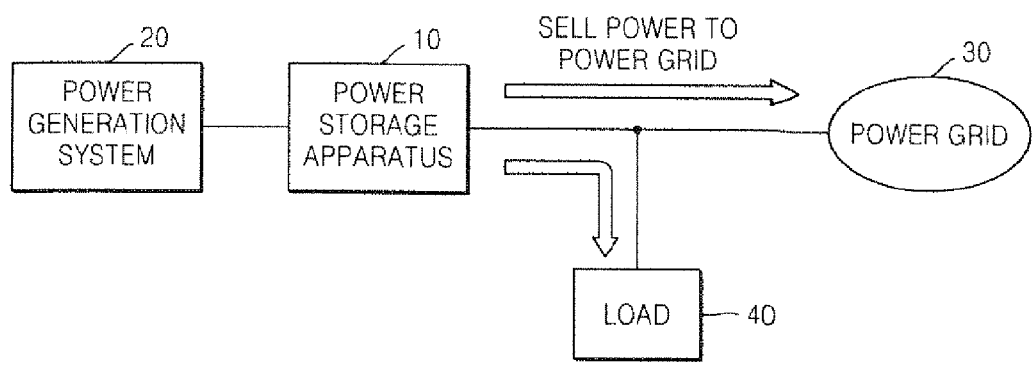
FIG. 4 is a diagram illustrating a flow of power in a power selling operation, according to an embodiment of the present invention.

The power selling control unit 230 controls the components in the power storage apparatus so that the power stored in the battery cell 110 may be supplied to the power grid 30. As shown in FIG. 4, the power storage apparatus 10 supplies the power stored in the battery cell 110 to the power grid 30 so as to sell or provide the power of the battery cell 110 to the power grid 30. In addition, the power storage apparatus 10 may sell the power supplied from the power generation system 20 to the power grid 30.

Figure 3:
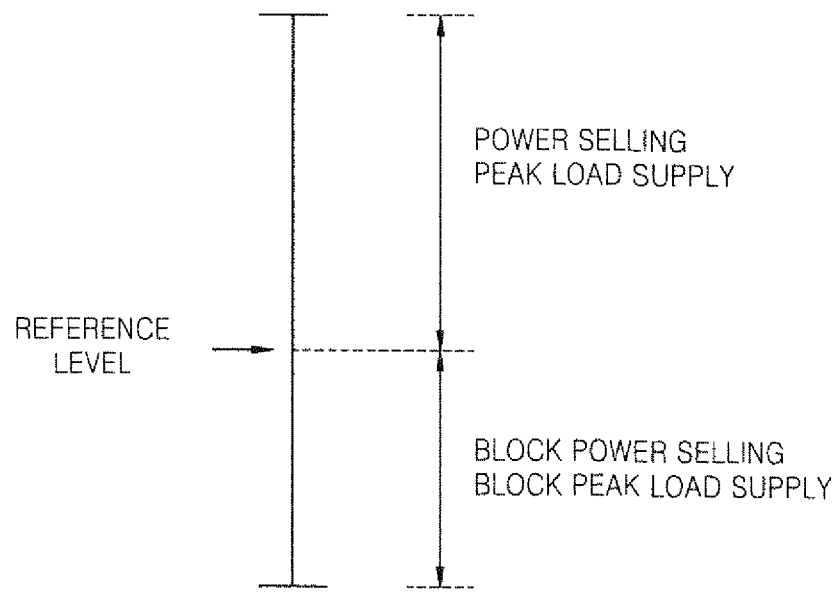
FIG. 3 is a diagram illustrating power selling control and peak load control according to an embodiment of the present invention.

However, if the remaining amount of power in the battery cell is lower than a reference remaining level while the power stored in the battery cell 110 is being supplied to the power grid 30 as shown in FIG. 3, the power selling control unit 230 of the present embodiment blocks the power supply from the battery cell 110 to the power grid 30. To do this, the power selling control unit 230 of the present embodiment determines the control of the power supply to the power grid 30 based on the remaining amount of power in the battery cell 110 sensed by the monitor unit 210. When the remaining amount of power in the battery cell 110 is greater than the reference remaining level and the power is supplied from the battery cell 110 to the power grid 30, the power selling control unit 230 controls the battery management unit 120, the bi-directional converter 130, the bi-directional inverter 140, the first switch 150, and the second switch 160 so that the power stored in the battery cell 110 may be supplied to the power grid 30. Under the control of the power selling control unit 230, the battery management unit 120 enables discharging process of the battery cell 110, and the operations of the bi-directional converter 130, the bi-directional inverter 140, the first switch 150, and the second switch 160 enables power to flow from the battery cell 110 to the power grid 30.

When the remaining amount of power in the battery cell 110 is lower than the reference level, the power selling control unit 230 may control the battery management unit 120 and the bi-directional converter 130 so as to block the power supply from the battery cell 110 to the power grid 30. In other words, in this case, the battery management unit 120 may stop the discharging process of the battery cell 110, and/or the bi-directional converter 130 may be turned to a state, in which the flow of power through the bi-directional converter 130 is disabled.

The peak load control unit 240 controls the supply of the power stored in the battery cell 110 to the load 40 when the peak load occurs in the load 40. Here, the peak load represents a case where power consumption of the load 40 per hour is equal to or greater than a reference power consumption level. The reference power consumption level may be determined according to the maximum amount of power per hour that is able to be supplied from the power grid 30.

Figure 5:
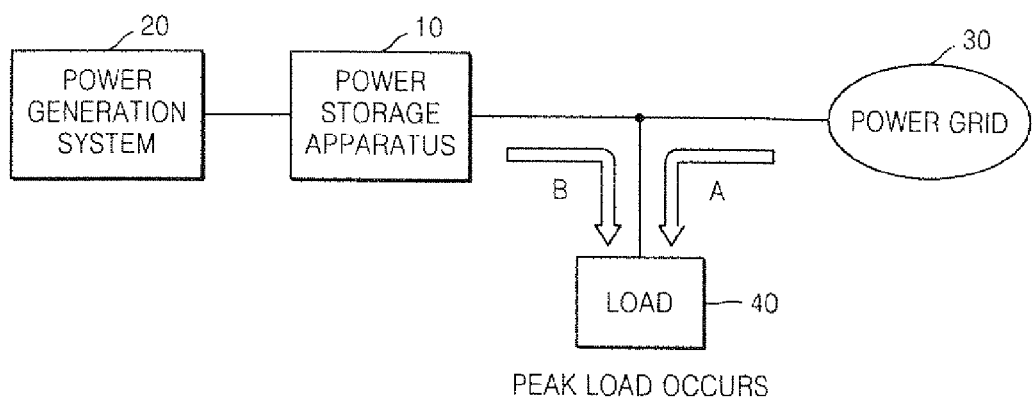
FIG. 5 is a diagram illustrating a flow of power when a peak load occurs, according to an embodiment of the present invention.

As shown in FIG. 5, when the peak load occurs in the load 40, even when the power grid 30 normally operates to supply the power A, additional power B may be supplied from the power storage apparatus 10. As shown in FIG. 3, while the peak load occurs and the power stored in the battery cell 110 is supplied to the load 40, the peak load control unit 240 of the present embodiment blocks the power supply from the battery cell 110 to the load 40 when the remaining amount of power in the battery cell 110 is lower than the reference level. To this end, the peak load control unit 240 of the present embodiment determines the control of the power supply to the load 40 based on the remaining amount of power in the battery cell 110 sensed by the monitor unit 210. The peak load control unit 240 controls the battery management unit 120, the bi-directional converter 130, the bi-directional inverter 140, the first switch 150, and the second switch 160 so as to supply the power stored in the battery cell 110 to the load 40 when the remaining amount of power in the battery cell 110 is greater than the reference level and the peak load occurs in the load. When the remaining amount of power in the battery cell 110 is lower than the reference level, the peak load control unit 240 may control the battery management unit 120 and the bi-directional converter 130 so as to block the power supply from the battery cell 110 to the load 40 even when the peak load occurs.

Figure 6:
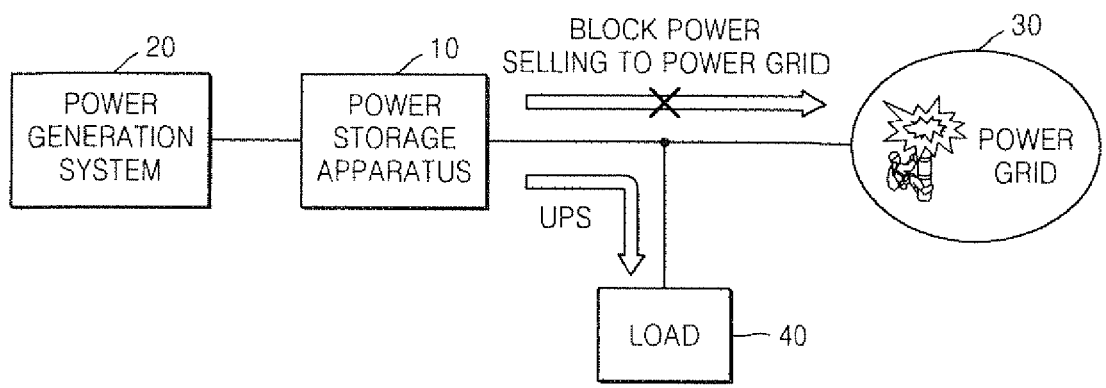
FIG. 6 is a diagram illustrating a flow of power when performing an uninterruptible power supply (UPS) function, according to an embodiment of the present invention.

As shown in FIG. 6, when the power grid 30 is in the abnormal state, the UPS control unit 250 controls the components of the power storage apparatus so as to output the power stored in the battery cell 110 or the power generated by the power generation system 20 to the load 40, and blocks the power supply from the power storage apparatus 10 to the power grid 30. For example, the UPS control unit 250 may turn off the second switch 160 to block the power supplied from the battery cell 110 or the power generation system 20. Therefore, according to the present embodiment, the power may be supplied to the load 40 even when the power grid 30 is in the abnormal state such as when an electric failure occurs.

In addition, when the power grid 30 is in the abnormal state, the UPS control unit 250 performs a sole operation prevention control for blocking the power supply to the power grid 30. When the power grid 30 is in the abnormal state due to repair and management of distribution lines or an accident such as the occurrence of an electric failure, the UPS control unit 250 electrically separates the power storage apparatus 10 from the power grid 30 to prevent an accident such as an electric shock applied to a worker working on the line management or repair from occurring, and to prevent the power grid 30 from badly affecting electrical equipment due to the operation in the abnormal state. Moreover, when the power grid 30 returns to the normal state from the sole operation, a phase difference is generated between the voltage of the power grid 30 and the output voltage of the power storage apparatus 10 which is in the sole operating state, and thus, the power storage apparatus 10 or the power generation system 20 may be damaged. The UPS control unit 250 performs control functions in order to synchronize phases of the AC voltage of the power grid 30 and the output voltage of the power storage apparatus 10.

According to the present embodiment, when the remaining amount of power in the battery cell 110 is lower than the reference level, the power supply from the battery cell 110 to the power grid 30 is blocked, and the power is not supplied to the load 40 even when the peak load occurs. Therefore, the remaining power of the battery cell 110 may be maintained at the reference level or higher when the power grid 30 is in the normal state, and thus, the UPS operation that is executed when the power grid 30 is in the abnormal state may be performed stably.

Figure 7:
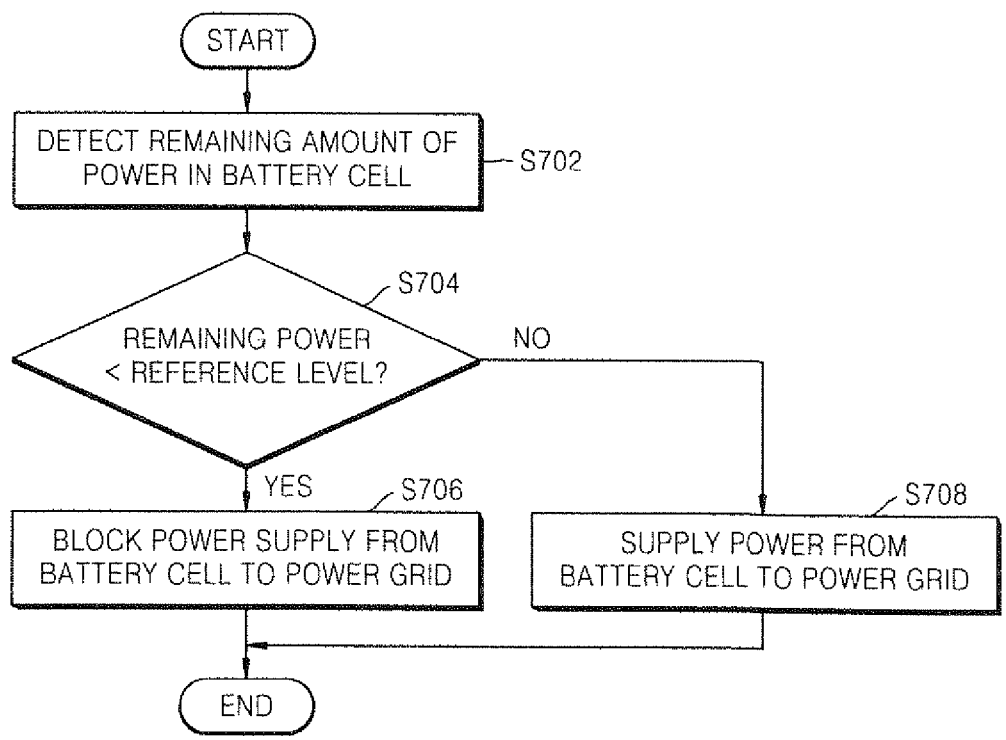
FIG. 7 is a flowchart illustrating processes of controlling power supply from a power storage apparatus to a power grid, according to an embodiment of the present invention.

FIG. 7 is a flowchart illustrating processes of controlling the power supply from the power storage apparatus 10 to the power grid 30, according to an embodiment of the present invention. Operations illustrated in FIG. 7 may be performed when the central controller 180 operates in a mode where the power is supplied from the power storage apparatus 10 to the power grid 30.

As described above, according to the present embodiment, when the remaining amount of power in the battery cell 110 is lower than the reference level, the power supply from the power storage apparatus 10 to the power grid 30 is blocked. To this end, the remaining power in the battery cell 110 is detected in operation S702. When it is determined that the remaining power of the battery cell 110 is lower than the reference level in operation S704, the power supply from the battery cell 110 to the power grid 30 is blocked in operation S706. When it is determined that the remaining power of the battery cell 110 is higher than the reference level in operation S704, the power is supplied from the battery cell 110 to the power grid 30 in operation S708.

Figure 8:
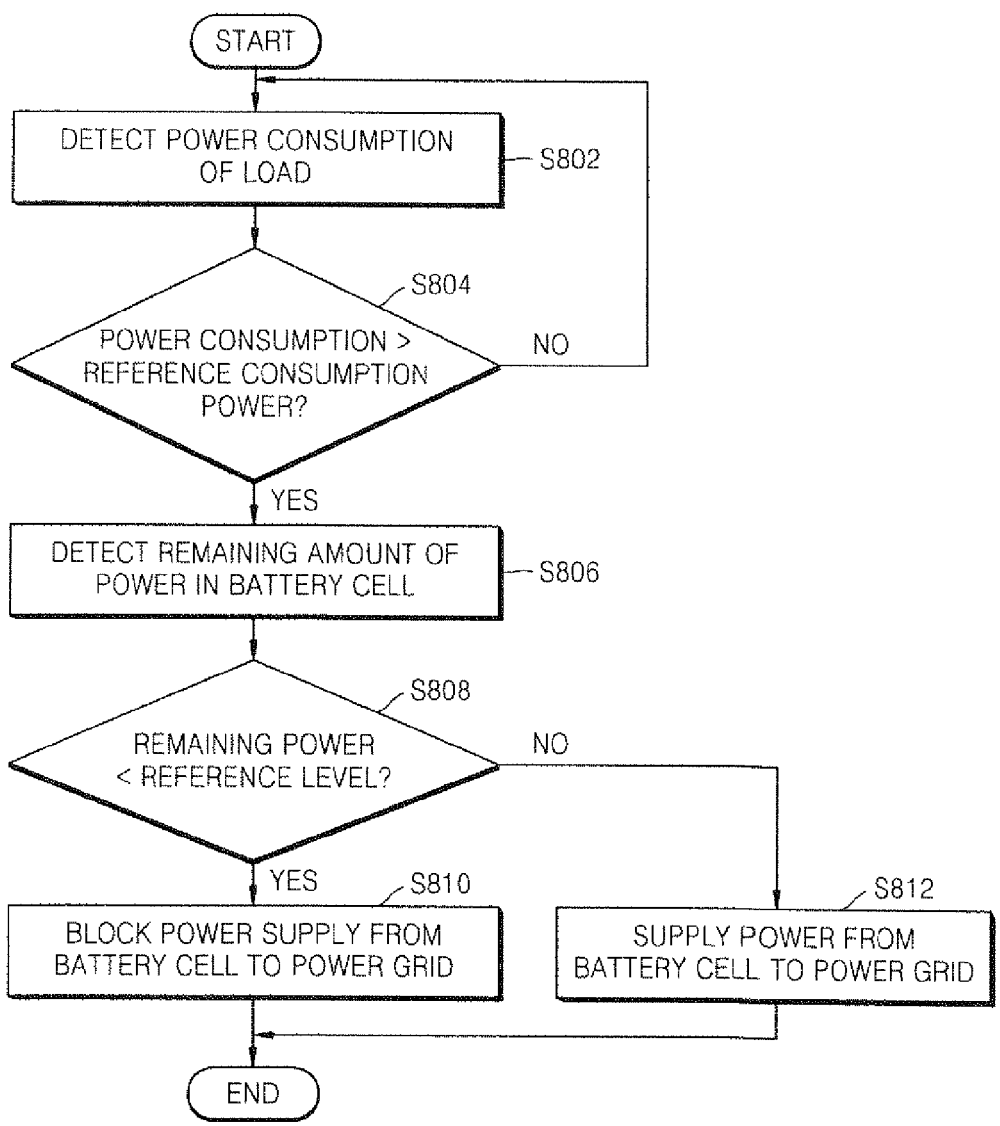
FIG. 8 is a flowchart illustrating processes of supplying power from the power storage apparatus to a load when the peak load occurs, according to an embodiment of the present invention.

FIG. 8 is a flowchart illustrating processes of supplying the power from the power storage apparatus 10 to the load 40 when the peak load occurs, according to an embodiment of the present invention.

In order to detect the peak load, power consumption of the load 40 per hour is detected in operation S802. When it is determined that the power consumption per hour of the load 40 is higher than the reference power consumption level in operation S804, it is determined that the peak load occurs, and the remaining amount of power in the battery cell 110 is detected in operation S806. When it is determined that the remaining power of the battery cell 110 is lower than the reference level in operation S808, the power supply from the battery cell 110 to the load 40 is blocked in operation S810. When the remaining power of the battery cell is higher than the reference level in operation S808, the power is supplied from the battery cell 110 to the load 40 corresponding to the peak load in operation S812.

According to the embodiments of the present invention, the power selling and the function corresponding to peak load are not performed when the remaining amount of power in the battery cell is lower than the reference level, and thus, the UPS function may be performed stably.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A power storage apparatus comprising:
    a bi-directional inverter connected between a first node and a second node connected to a power grid and a load, the bi-directional inverter converting a direct current (DC) voltage supplied from the first node to an alternating current (AC) voltage and outputting the AC voltage to the second node, the bi-directional inverter converting an AC voltage supplied from the power grid to a DC voltage and outputting the DC voltage to the first node;
    at least one battery cell;
    a battery management unit for detecting a remaining amount of power in the at least one battery cell and controlling charging/discharging of the at least one battery cell;

a bi-directional converter connected between the battery management unit and the first node, the bi-directional converter converting a DC voltage supplied from the at least one battery cell to another DC voltage and outputting the another DC voltage to the bi-directional inverter via the first node, the bi-directional converter converting a DC voltage supplied from the bi-directional inverter to another DC voltage and outputting the another DC voltage to the at least one battery cell; and a central controller performing a control operation for charging the at least one battery cell with power supplied from the power grid, the central controller controlling the battery management unit, the bi-directional converter, and the bi-directional inverter so as to supply power stored in the at least one battery cell to the power grid, the central controller blocking power supply from the at least one battery cell to the power grid when the remaining amount of power of the at least one battery cell is lower than a reference level.

2. The power storage apparatus of claim 1, wherein the central controller controls the battery management unit, the bi-directional converter, and the bi-directional inverter so as to supply the power from the at least one battery cell to the load when the power grid is in an abnormal state.

3. The power storage apparatus of claim 1, wherein the central controller controls the battery management unit, the bi-directional converter, and the bi-directional inverter so as to supply the power stored in the at least one battery cell to the load when power consumption of the load is equal to or greater than a reference power consumption level.

4. The power storage apparatus of claim 3, wherein the central controller controls the battery management unit, the bi-directional converter, and the bi-directional inverter so as not to supply the power stored in the at least one battery cell to the load even if the power consumption of the load is equal to or greater than the reference power consumption level, when the remaining power of the at least one battery cell is lower than the reference level.

5. The power storage apparatus of claim 1, further comprising a power conversion unit for converting power supplied from a power generation system into a DC voltage and outputting the DC voltage to the bi-directional converter via the first node, the bi-directional converter converting the DC voltage from the power conversion unit to another DC voltage and outputting the another DC voltage to the at least one battery cell.

6. The power storage apparatus of claim 5, wherein the power generation system includes a solar battery, and the power conversion unit controls a level of generated power so as to track a maximum power supply voltage from the solar battery by using a maximum power point tracker (MPPT) algorithm.

7. The power storage apparatus of claim 1, further comprising a voltage stabilization unit connected to the first node for stabilizing a voltage level at the first node.

8. The power storage apparatus of claim 1, further comprising:
a first switch connected between the bi-directional inverter and the second node; and
a second switch connected between the second node and the power grid, wherein the central controller turns the first switch and the second switch on when the power grid is in the normal state, and turns the first switch on and turns the second switch off when the power grid is in the abnormal state.

* * * * *